Figure 1:
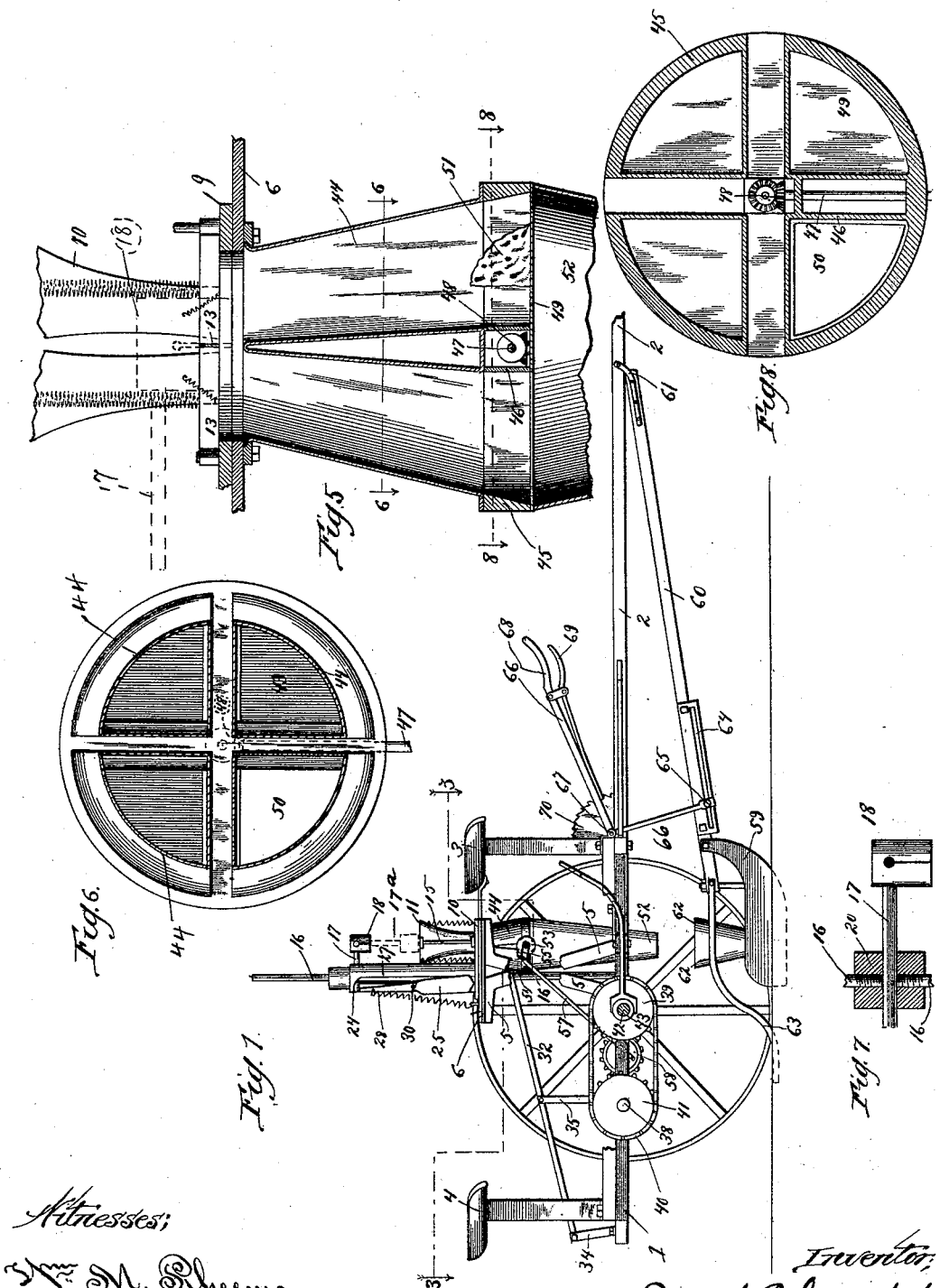

(No Model.) 3 Sheets—Sheet 1.

J. P. DAVENPORT.
POTATO PLANTER.

No. 498,773. Patented June 6, 1893.

Witnesses:
Wm. M. Rheem
Wm. F. Henning

Inventor:
Joseph P. Davenport
By Elliott & Curohundy
Attys (No Model.) 3 Sheets—Sheet 2.

J. P. DAVENPORT.
POTATO PLANTER.

No. 498,773. Patented June 6, 1893.

Witnesses:
Inventor,
Joseph P. Davenport
By Elliot & Ouoluyko
Attys

THE NORRIS PETERS CO., PHOTO-LITHO., WASHINGTON, D. C.

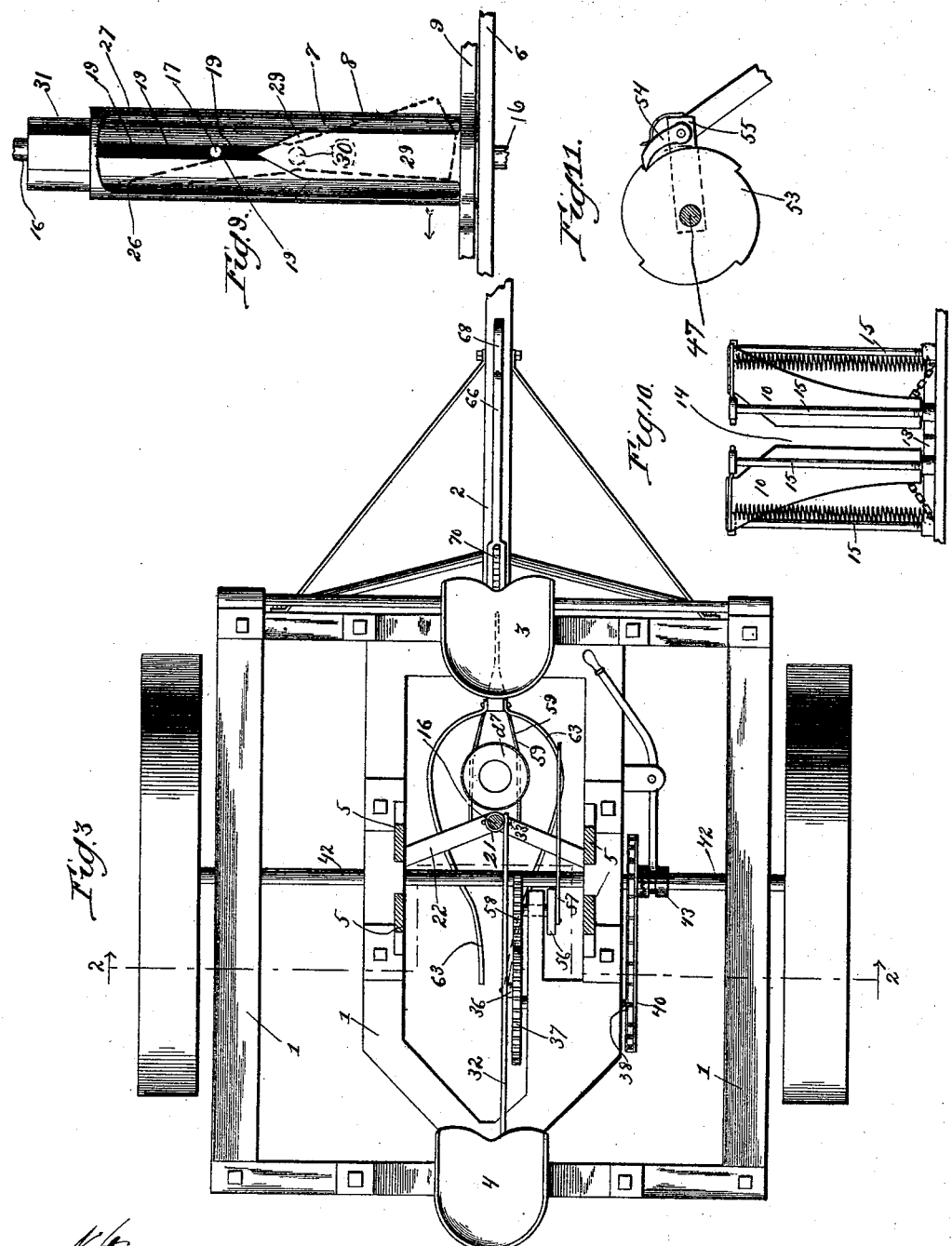

UNITED STATES PATENT OFFICE.

JOSEPH P. DAVENPORT, OF DOWNER'S GROVE, ILLINOIS.

POTATO-PLANTER.

SPECIFICATION forming part of Letters Patent No. 498,773, dated June 6, 1893.

Application filed August 15, 1892. Serial No. 443,118. (No model.)

*To all whom it may concern:*

Be it known that I, JOSEPH P. DAVENPORT, a citizen of the United States, residing at Downer's Grove, in the county of Du Page and State of Illinois, have invented certain new and useful Improvements in Potato-Planters, of which the following is a full, clear, and exact specification.

My invention relates to that class of potato planters designed to first cut the potato into the requisite number of pieces for planting, and then drop the pieces at proper intervals into a row formed by the machine as it proceeds, after which they are covered by means of suitable covering devices. In the use of automatic planters of this character, it is customary and necessary for the attainment of good results, to place the potatoes into the feed hopper or cutting mechanism, one at a time, by hand, so as to insure that the cutting mechanism will not quarter or sever the potato at such places as to destroy the eyes or sprouts. Ordinarily, the hopper employed is provided at its bottom with knives so arranged that they, in conjunction with a rising and falling plunger, will cut the potato into the desired number of parts, whereupon, such parts are discharged or dropped *via* separate chutes or spouts into the row or furrow in the field.

Heretofore, so far as I am aware, it has been customary to either employ a single hopper and cutting mechanism, or else where a number of hoppers are employed, to provide each hopper with an individual set of chutes or spouts for conveying the pieces of potato away from the cutting mechanism to a dropping box or other suitable device where they are held until dropped into the furrow. Where but one hopper is employed, obviously, the operation is rendered slow and tedious by the necessity of having to wait for the plunger to rise out of the hopper before another potato can be deposited therein, and then it becomes necessary to deposit it with much haste and without the deliberation necessary for its proper arrangement in the hopper; and where a multiplicity of chutes or spouts is employed, the operating parts are necessarily complicated, and the machine is heavy and bulky rendering it extra burdensome for the draft animals, to say nothing of the additional cost of manufacture, and the increased liability of getting out of order.

My invention is designed to overcome these difficulties, and it has for its primary object, to make it possible to place a potato in one hopper or cutting mechanism, while the potato in another is being cut and planted, and to do away with the multiplicity of chutes or spouts heretofore employed.

In a more limited sense, the object of my invention is to cause a number of hoppers or cutting devices to alternately feed into a single set of chutes or spouts, common to all of such hoppers.

A further object of my invention, is to arrange the lower ends of all of the chutes or spouts which lead from the cutting mechanism, over a common discharge or dropping chute, and successively or alternately open such first chutes or spouts into the second.

With a view to the attainment of these objects and certain other objects of minor importance hereinafter described, my invention consists in certain features of novelty hereinafter fully explained with reference to the accompanying drawings, and more particularly pointed out in the claims.

Figure 2:
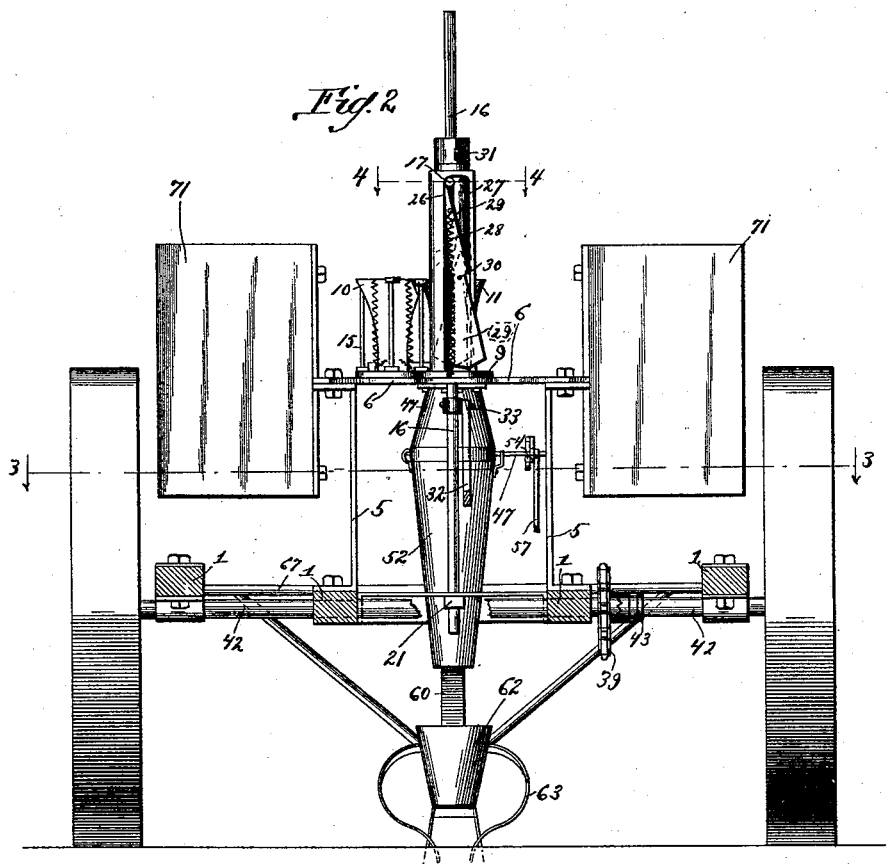
Figure 4:
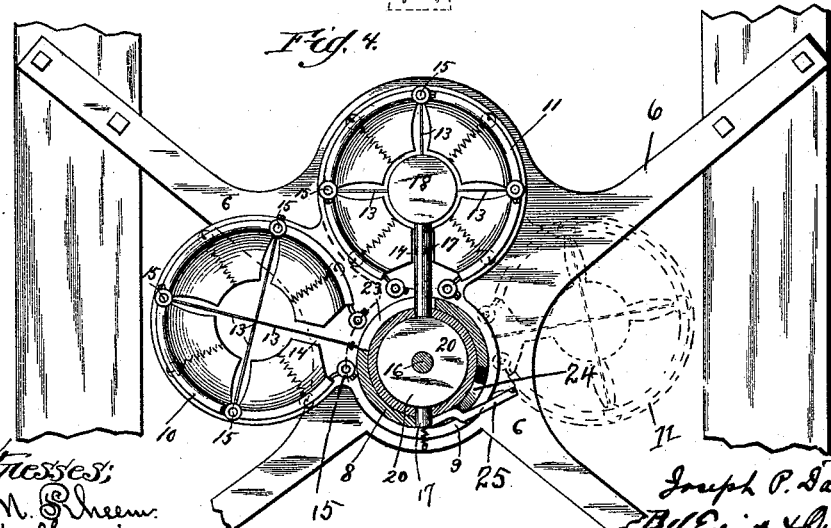

In the said drawings, Figure 1, is a general view of my improved apparatus in side elevation, the potato boxes and one of the wheels being omitted, and certain parts being broken away for the sake of clearness. Fig. 2, is a transverse sectional view on a larger scale taken on the line 2—2, Fig. 3, looking from the rear. Fig. 3, is a plan section taken on the line 3—3, Figs. 1 and 2. Fig. 4, is an enlarged detail sectional view of the hoppers and operating mechanism taken on the line 4—4, Fig. 2. Fig. 5, is an enlarged detail vertical sectional view of the chutes or spouts which convey the pieces of potato away from the cutting mechanism, also illustrating the valve or dropping mechanism, and a portion of the discharge or dropping chute. Fig. 6, is a transverse section thereof taken on the line 6—6, Fig. 5. Fig. 7, is a detail sectional view illustrating the means for securing the plunger and its operating stem together. Fig. 8, is a plan sectional view showing the valve and its operating mechanism, hereinafter described, taken on the line 8—8 Fig. 5. Fig. 9, is an enlarged detail view of the means for causing the oscillation of the hoppers. Fig. 10, is an enlarged detail view of one of the hoppers showing the slot therein for the passage of the plunger arm, and Fig. 11, is a detail view of the pawl and ratchet for actuating the valve or dropping mechanism.

Like signs of reference indicate like parts throughout the several views.

In carrying out my invention I employ a number, preferably a pair of suitable hoppers, in conjunction with cutting mechanism, which are mounted on the frame of the machine in such a manner as to be capable of oscillating or successively moving under the plunger; and below these hoppers and in their line of movement, I arrange a set of chutes or spouts in such a position that the hoppers may be alternately brought into coincidence with them, the number of chutes or spouts in the set being dependent upon the number of pieces into which the cutting mechanism is adapted to cut the potato. Directly under the lower ends of these chutes or spouts I locate a valve or dropping mechanism adapted to open the chutes or spouts successively, and permit the contents thereof, to drop out into a discharge or dropping chute arranged under the valve or dropping mechanism. The plunger, before referred to, is arranged to rise and fall always in the same place so as to properly descend into each hopper as they come into coincidence with the said stationary set of spouts or chutes.

In conjunction with the mechanism for operating the plunger, I provide means for causing the hoppers to oscillate from side to side as the plunger rises and falls. The mechanism for actuating the plunger is so timed with relation to the mechanism for opening the spouts or chutes leading from the cutting mechanism, that all of said spouts or chutes will be opened in succession while the plunger makes but one stroke.

Referring now more particularly to the drawings, 1 is a bed-frame having a tongue 2, or other suitable draft device, and being provided with seats 3—4, for a driver and feeder respectively. Mounted upon the frame 1, by means of any suitable standards 5, is a table or platform 6, upon which is placed and secured a cylindrical standard or post 7. Located upon this post 7, is a sleeve or box 8, at or near whose lower end is formed, or otherwise secured, a foot or base piece 9, upon which latter is mounted, in any suitable manner, the hoppers 10—11. These hoppers and the potato knives or cutters 13, may be of any suitable or well-known construction, such for instance, as shown in United States patent to W. E. Canedy, No. 343,983, issued June 22, 1886, to which reference may be had for an understanding of the construction and operation of the hoppers herein shown. There is a material difference however, between the hoppers shown in said patent, and the form which I employ, in that, in the latter, each hopper is provided with a vertical slot 14, for the passage of the arm 17 of the plunger 18 hereinafter described. In order to provide for this slot, I arrange a post or standard 15, on each side thereof, and pivot the adjacent sections of the hopper in these posts respectively, instead of pivoting both sections in one post or standard, as in the said patent. Otherwise the construction may be the same as shown in the patent referred to. The cylindrical post 7 is hollow, and rigidly fixed to the platform or table 6, and passing vertically through this post is the plunger stem or rod 16, to which is secured a transverse arm 17 upon one end of which is mounted the plunger 18, the post 7 being provided in both sides with a vertical slot 19, through which the arm of the plunger passes, and by means of which the movement of the plunger is restricted to a vertical direction.

The stem 16 and arm 17 may be adjustably secured together in any convenient way, but I prefer to construct the stem in two parts, as more clearly shown in Fig. 7, and to secure these parts together by means of a nut or turn buckle 20, into which the ends of the stem are threaded, and through which, between the ends of such stem, pass the arm 17. Thus by turning the ends of the stem in their threaded sockets in the turn buckle, the arm 17 will be impinged by the ends of the stem, and securely but adjustably held in place.

The turn buckle 20 may be fitted to the contour of the interior of the post 7, if desired, as shown in Fig. 4, and thus constitute a guide for the upper end of the stem 16. The lower end of the stem passes through, and is guided by, a suitable box or collar 21, mounted on the frame by means of arms or supports 22. The plunger may be of the usual construction with slots for the reception of the knives 13.

The sleeve 8 on both sides is cut away, as shown at 23—24, in order that the arm 17 may not interfere with its rotary movement on the post 7. At the cut-away portion at one side, preferably the portion 24 at the rear side, is arranged a vertical, pivoted incline or switch 25, which gradually tapers to a point from its lower end upward. The upper end of this switch is bent inward slightly as shown in Fig. 4, whereby it is adapted to rest against the side edges 26—27 of the sleeve 8; and in order that it may be yieldingly held against either of these edges, according to the direction in which the sleeve is turned, I provide it with any suitable spring which will act to force the switch in one direction or the other as soon as its upper end passes a point directly over its pivot. As an example of a spring for accomplishing this object, I have shown a coil spring 28, attached at one end to the upper end of the switch, and at its other end to some stationary part, such as the table 6. Thus it will be seen that when the sleeve is turned a certain distance in one direction the upper end of the switch will be pulled in the opposite direction and held against, say the edge 26, until the sleeve is turned in opposite direction whereupon it will be pulled back against the edge 27. Hence with a spring thus arranged, it is not necessary to first shift the upper end of the switch to a point to one side of its pivotal point in order to cause the spring to throw the switch, but it is only necessary to turn the sleeve so that the pivotal point of the switch will be to one side of a straight line drawn between the points of attachment of the spring. The switch may be pivoted to any suitable projection or standard formed on the base or foot 9. I prefer however, to leave a tongue or projection 29 in the cut-away portion 24 of the sleeve 8, and pivot the switch to this tongue by means of a pin or bolt 30, the upper end of the tongue being sharpened or beveled on both sides, as more clearly shown in Fig. 9, so as not to project beyond the edges of the switch on either side.

With the construction described, it will be seen that when the plunger rod or stem is forced downward, the transverse arm 17 will come in contact with the inclined edge of the switch 25, and inasmuch as the movement of such arm is restricted to a vertical line by the slot 19, the pressure of the arm against the switch will cause the sleeve 8 to rotate on the post 7 until the arm passes the pivotal point 30 of the switch, whereupon the arm will come in contact with the edge of the lower end of the switch which is dovetailed, and force its upper end to the other side of the cut-away portion 24, where it will be held by the spring 28. But as before intimated, the dovetailed end of the switch is not absolutely essential, for the spring itself will cause the switch to shift as before explained. The parts are so timed that by the time the arm 17 descends as far as the pivot 30, the foot or base 9 will have been shifted or turned sufficiently far to carry one of the hoppers to one side, and the other one into a proper position directly under the plunger 18. After the arm 17 has reached the pivotal point 30, going downward, the movement of the hopper will of course cease, as the arm will then ride in one of the vertical grooves or slots formed by the tongue 29, and edges 26—27 of the sleeve 8, which groove, at that time, will of course, be in line with the slot 19; and the distance which the arm 17 travels, after passing the pivotal point 30 going downward, is sufficient to allow the plunger to descend the requisite distance into the hopper for cuting the potato. When the plunger rises again the end of the arm 17 will come up under the upper end of the switch 25, between such switch and one edge of the sleeve 8, and before it reaches the upper extremity of the slot 19, it will force such switch to one side against the inertia of the spring 28, and when it rises above such end, the spring will again draw the switch against the edge of the sleeve, thus causing its sharp point to engage between such edge of the sleeve and the arm 17 in the manner shown in Fig. 2. Hence, when the plunger again descends the arm will strike the opposite side of the switch to that against which it formerly impinged, and riding down this side, will descend into the groove on the opposite side of the tongue 29, and thus cause the sleeve to turn in the opposite direction, and bring the hopper, which was formerly under the plunger, back again and carry the other one off to one side. The upper end of the post 7 may be formed with screw threads (not shown) provided with a nut 31 as shown in Fig. 9 for holding the sleeve 8, against vertical displacement, such nut being provided with a passage for the upper end of the stem 16.

I accomplish a vertical reciprocation of the plunger stem 16, by means of a lever 32, secured at one end to the plunger stem, as shown at 33, and at its other end to a pivoted standard, 34, while at an intermediate point it is connected, preferably, by means of a connecting rod 35, with a wrist pin or crank 36, on a gear wheel 37. This gear wheel 37 may be mounted on a shaft 38, which is driven by a sprocket wheel 39 connected with such shaft through the medium of a sprocket chain 40, and sprocket wheel 41, and being itself mounted upon the axle 42 of the machine and adapted to be driven thereby. I prefer however, to mount the wheel 39, loosely upon the axle, and provide a clutch 43, by means of which such wheel may be caused to rotate with the axle when desired.

Secured to the under side of the table or platform 6, directly under an opening therein, with which the hoppers coincide when in operative position, is a set of spouts or chutes 44, corresponding in number to the number of pieces into which the potato is cut by the knives 13, preferably 4. These spouts or chutes are so arranged, as will be understood, that the several pieces of potato 51, as they leave the lower end of the hopper where the knives are usually situated, will fall, one into each of the spouts; the spouts being widened at their lower ends so as to guard against the pieces becoming lodged as they descend therein. The spouts may be of any desired contour, I have shown in the drawings and I prefer to employ spouts quadrantal in cross section.

The spouts 44 are of sufficient length to hold the pieces of potato in readiness to be dropped, and at their lower ends is supported a ring or band 45, which is divided into four sections by webs 46, corresponding to the edges of the spouts. The ring 45, however, is simply a continuation of the spouts 44, it being employed for the purpose of affording a firm support for a horizontal shaft 47, which is provided with a miter-gear connection 48 with a rotary valve or dropping device 49, arranged directly under the ring 45. This valve 49 is provided with an opening 50, which, as the valve rotates comes successively into coincidence with the spouts 44, and permits the pieces of potato to drop through into a common discharge spout or chute 52. This dropping chute 52 is arranged permanently under all of the spouts 44 directly below the valve 49, and it is preferably of funnel shape, as shown more clearly in Fig. 2, whereby all of the pieces of potato dropping from any of the spouts 44, will be caught and dropped in a straight line along the furrow as the machine proceeds.

Mounted on the shaft 47, is a ratchet wheel 53, whose periphery is provided with a number of teeth corresponding to the number of spouts 44 employed. This ratchet wheel is given a step by step rotation by means of a pawl or dog 54, mounted upon a pivoted arm 55, and receiving an intermittent movement from a crank wheel 56, through the medium of a connecting rod 57. This crank wheel 56 in turn is rotated by a pinion 58, which is normally in engagement with the gear wheel 37. The gear wheel 37 is connected with the plunger stem, and each revolution thereof causes the plunger to make one stroke and the hoppers to oscillate in one direction, and inasmuch as it is necessary that all of the spouts 44 should be emptied before another potato is cut, it will of course be understood that the pinion 58 should be equal to the diameter of the gear 37, divided by the number of spouts 44, employed. In the example shown, the proportion is one to four, but of course any desired number of spouts may be employed, and if desired the valve may be given a continuous instead of an intermittent rotation.

Arranged under and slightly forward of the funnel or dropping chute 52, is an ordinary furrow opening plow 59 whose beam 60 is hinged at its forward end to the tongue 2, as shown at 61, and mounted between the side pieces of this plow is a supplemental funnel 62 into which the pieces of potato fall from the funnel 52, and are thus more accurately dropped. To the rear end of the beams 60 may be secured any suitable covering devices 63.

In order that the plow may be yieldingly held in the ground so as to be capable of rising without causing injury to any of the connections, in the event it strikes an obstruction, I provide the beam 60 with a longitudinal slot 64, which may be formed, if desired, in a separate casting secured thereto as shown, and in this slot I arrange a stud 65 which is secured to the lower end of one arm of a bell crank lever 66. The bell crank lever 66 is pivoted at 67 to the machine, and is provided at one end with a foot or hand piece 68, by means of which it may be held down against ordinary pressure by the foot or hand of the driver. The lever may be locked against downward movement by means of a dog or pawl 69, which is adapted to engage a segmental ratchet 70, the teeth of such ratchet being so formed as to permit the dog to slip over them when the lever is moved upward. The angle of the arms of the lever 66, is such that the depending arm carrying the stud 65 can never turn far enough to bring such stud directly under the pivotal point 67. The object of this is, that should the plow strike an obstruction tending to elevate the same, the stud 65 would be at liberty to run forward in the slot 64, and therefore, the plow would be at liberty to rise. For ordinary purposes, the plow may be held in the ground with sufficient force by the friction of the stud 65 in the slot 64, and the dog 69 against the teeth of the ratchet 70. If, however, this should prove insufficient, the desired result may be accomplished by applying the foot to the lever.

The machine may be provided with a potato box 71, on both sides so as to be handy to the feeder as the hoppers oscillate from side to side.

If desired, instead of forming a slot in each hopper for the passage of the arm 17, substantially the same end may be attained by providing such arm with a downwardly projecting elbow 17$^a$ and mounting the plunger on the lower end thereof as shown in dotted lines in Fig. 1, but the form first described I have found, is preferable as it is not liable to lose its adjustment.

I claim—

1. In a potato planter, the combination of a number of hoppers, cutting mechanism, and a set of chutes or spouts common to all of said hoppers for receiving the pieces of potato therefrom from all of said hoppers, substantially as set forth.

2. In a potato planter, the combination of a number of hoppers, cutting mechanism, a set of chutes or spouts common to all of said hoppers for receiving the portions of potato therefrom, and means for alternately bringing said hoppers and set of spouts into coincidence, substantially as set forth.

3. In a potato planter, the combination of a number of movable hoppers, cutting mechanism, a set of spouts common to all of said hoppers for receiving the pieces of potato therefrom, and means for alternately moving said hoppers over said spouts, substantially as set forth.

4. In a potato planter, the combination of a number of movable hoppers, cutting mechanism, a set of spouts common to all of said hoppers for receiving the pieces of potato therefrom, means for alternately moving said hoppers over said spouts, and means for successively opening said spouts to permit the pieces of potato therein, to discharge, substantially as set forth.

5. In a potato planter, the combination of a number of movable hoppers, cutting mechanism, a set of spouts common to all of said hoppers for receiving the pieces of potato therefrom, means for alternately moving said hoppers over said spouts, and a dropping chute common to all of said spouts, arranged thereunder, substantially as set forth.

6. In a potato planter, the combination of a number of movable hoppers, cutting mechanism, a set of spouts common to all of said hoppers for receiving the pieces of potato therefrom, means for alternately moving said hoppers over said spouts, and a rotary valve arranged under said spouts, substantially as set forth.

7. In a potato planter, the combination of a number of movable hoppers, cutting mechanism, a set of spouts common to all of said hoppers for receiving the pieces of potato therefrom, means for alternately moving said hoppers over said spouts, a valve arranged under said spouts, and a common dropping or discharge chute arranged under all of said spouts and valve, substantially as set forth.

8. In a potato planter, the combination of a number of movable hoppers, cutting mechanism, a set of spouts common to all of said hoppers for receiving the pieces of potato therefrom, means for alternately moving said hoppers over said set of spouts, a rotary valve arranged to close some of said spouts, and means for imparting an intermittent rotation to said valve, substantially as set forth.

9. In a potato planter, the combination of a number of movable hoppers, cutting mechanism, a set of fixed spouts common to all of said hoppers, a common discharge or dropping chute arranged under said set of spouts, and means for alternately moving said hoppers over said set of spouts, substantially as set forth.

10. In a potato planter, the combination of a number of movable hoppers, cutting mechanism and a set of fixed chutes or spouts common to all of said hoppers for receiving the pieces of potato therefrom, each of said hoppers being adapted to coincide with all of said chutes at once, substantially as set forth.

11. In a potato planter, the combination of a number of hoppers, cutting mechanism and a set of fixed spouts located under said cutting mechanism and adapted to receive and retain the sections of potato preparatory to dropping, substantially as set forth.

12. In a potato planter, the combination of a number of movable hoppers, cutting mechanism adapted to divide the potato into a number of sections, a set of fixed spouts common to all of said hoppers arranged under said cutting mechanism and corresponding in number to the number of sections into which the cutting mechanism is adapted to divide the potato and means for discharging the potato from said spouts, substantially as set forth.

13. In a potato planter, the combination of a number of movable hoppers, cutting mechanism adapted to divide the potato into a number of sections, a set of fixed spouts common to all of said hoppers arranged under said cutting mechanism and corresponding in number to the number of sections into which the cutting mechanism is adapted to divide the potato, a rotary valve common to all of said spouts and arranged thereunder, and means for actuating said valve to open said spouts, substantially as set forth.

14. In a potato planter, the combination of a number of movable hoppers, cutting mechanism adapted to divide the potato into a number of sections, a set of fixed spouts common to all of said hoppers and arranged under said cutting mechanism, each of said hoppers being adapted to coincide with all of said spouts at once, means for opening and closing the lower ends of said spouts and a dropping funnel arranged under the lower ends of said spouts, substantially as set forth.

15. In a potato planter, the combination of two hoppers, an oscillatory support for said hoppers, the potato knives, a pivotal incline carried by said support, a plunger having a portion adapted to engage with said incline for oscillating said support, and a set of chutes or spouts common to both hoppers, substantially as set forth.

16. In a potato planter, the combination of two hoppers, an oscillatory support for said hoppers, the potato knives, a pivoted incline carried by said support, a plunger having a portion adapted to engage with said incline for oscillating said support, a spring for holding said incline tilted to either side of its pivot, and a set of chutes or spouts common to both hoppers, substantially as set forth.

17. In a potato planter, the combination of two hoppers, an oscillatory support for said hoppers, potato knives, a spring actuated, pivoted incline carried by said support, a longitudinally reciprocating plunger-stem, and an arm or projection on such stem adapted to engage said incline alternately on opposite sides, substantially as set forth.

18. In a potato planter, the combination of two hoppers, the potato knives, a slotted post, an oscillatory support for said hoppers sleeved upon said post, the plunger stem passing through said post, an arm carried by said stem and arranged to play in the slot in said post, a spring actuated switch carried by said oscillatory support and arranged to be engaged by the said arm, and means for reciprocating said stem, substantially as set forth.

19. In a potato planter, the combination of a slotted post 7, two hoppers, the potato knives, an oscillatory support for said hoppers sleeved upon said post, a pivotal switch carried by said support and arranged lengthwise of said post, the plunger stem passing through said post and having an arm or projection arranged in said slot and adapted to engage said switch, and a set of spouts or chutes common to both hoppers, substantially as set forth.

20. In a potato planter, the combination of the slotted post 7, a slotted sleeve on said post having a base or foot, a spring actuated switch 25 carried by said sleeve, and a plunger stem passing through said post and having an arm or projection extending through the slots in said post, and sleeve and arranged to engage said switch for oscillating the said hoppers, substantially as set forth.

21. In a potato planter, the combination with a pair of oscillatory hoppers and cutting mechanism, a set of chutes or spouts common to both hoppers, a rotary valve arranged to close all but one of said chutes or spouts, a shaft geared to said valve for rotating it, and a pawl and ratchet for rotating said shaft, substantially as set forth.

22. In a potato planter, the combination with a reciprocating plunger, and a pair of oscillatory hoppers and potato knives, of a set of fixed spouts or chutes common to both hoppers, a valve having an opening for discharging said spouts or chutes successively, a gear wheel for reciprocating said plunger and oscillating said hoppers and a pinion for rotating said valve, the diameter of said pinion being equal to the diameter of said gear, divided by the number of said spouts or chutes, substantially as set forth.

23. In a potato planter, the combination with the plunger stem, a pair of oscillatory hoppers and cutting mechanisms, of a set of fixed spouts or chutes, common to both of said hoppers, a rotating valve having an opening arranged to close said chutes or spouts, the gear wheel 37, having a wrist pin, the lever 32 connected to said wrist pin and plunger stem, the pinion 58, meshing with the wheel 37, a connecting rod operated by said pinion, and a pawl and ratchet for rotating said valve, operated by said connecting rod, substantially as set forth.

24. In a potato planter, the combination of a hollow slotted post 7, an oscillatory hopper-support sleeved on said post, a switch carried by said support, a two-part plunger stem passing through said post, the nut 20 arranged in said post and having the two parts of said plunger stem threaded therein, and the plunger arm 17 passing through the slots of said post and through said nut between the ends of the plunger stem, substantially as set forth.

25. In a potato planter, the combination with the tongue or draft device, a plow having its beam hinged to said tongue and being provided with a longitudinal slot, and a bell crank lever having a stud on one arm engaged in said slot, substantially as set forth.

26. In a potato planter, the combination with the tongue or draft device, a plow having its beam hinged to said tongue and being provided with a longitudinal slot, a pivoted bell crank lever having a stud on one arm engaging in said slot, the ratchet 70 and a dog on the other arm of said lever, engaging with said ratchet, substantially as set forth.

JOSEPH P. DAVENPORT.

Witnesses:
F. A. HOPKINS,
R. C. OMOHUNDRO.

It is hereby certified that in Letters Patent No. 498,773, granted June 6, 1893 upon the application of Joseph P. Davenport, of Downer's Grove, Illinois, for an improvement in "Potato-Planters" an error appears in the printed specification requiring correction, as follows: In line 101, page 4, the clause "from all of said hoppers" should be stricken out; and that the said Letters Patent should be read with this correction therein that the same may conform to the record of the case in the Patent Office.

Signed, countersigned, and sealed this 20th day of June, A. D. 1893.

[SEAL]
JNO. M. REYNOLDS,
*Assistant Secretary of the Interior.*

Countersigned:
JOHN S. SEYMOUR,
*Commissioner of Patents.*